(12) United States Patent
Kanan et al.

(10) Patent No.: US 11,811,231 B1
(45) Date of Patent: Nov. 7, 2023

(54) SYSTEMS AND METHODS FOR STATE-OF-CHARGE DEPENDENT CONTROL OF AN ENERGY STORAGE SYSTEM

(71) Applicant: 8ME NOVA, LLC, El Dorado Hills, CA (US)

(72) Inventors: Nadim Kanan, Elk Grove, CA (US); Finbar Sheehy, San Diego, CA (US)

( * ) Notice: Subject to any disclaimer, the term of this patent is extended or adjusted under 35 U.S.C. 154(b) by 0 days.

(21) Appl. No.: 18/223,446

(22) Filed: Jul. 18, 2023

(51) Int. Cl.
*H02J 3/28* (2006.01)
*H02J 3/00* (2006.01)
*H02J 7/00* (2006.01)

(52) U.S. Cl.
CPC .............. *H02J 3/28* (2013.01); *H02J 3/007* (2020.01); *H02J 7/00* (2013.01)

(58) Field of Classification Search
CPC .... H02J 3/007; H02J 3/004; H02J 3/32; H02J 3/381; H02J 2300/24; H02J 2300/28; H02J 13/00001; H02J 13/00004; H02J 3/008; H02J 7/00712; H02J 7/35; G05B 19/042; G05B 13/02; G05B 19/04; G05B 2219/25252; G06Q 10/04; G06Q 50/06; H02S 10/20; H02S 40/38; H02S 50/00; H02S 10/00; Y02E 40/70; Y02E 60/00; Y02E 10/56; Y02E 70/30; Y04S 10/123; Y04S 50/10; Y04S 10/14; Y04S 10/40; Y04S 10/50; Y02P 90/50
See application file for complete search history.

(56) References Cited

U.S. PATENT DOCUMENTS

| | | | |
|---|---|---|---|
| 2012/0200264 A1* | 8/2012 | Choi ................... | H02J 7/0048 320/132 |
| 2012/0239214 A1* | 9/2012 | Nakashima ........... | H02J 7/34 700/286 |
| 2013/0162037 A1* | 6/2013 | Kim ..................... | H02J 3/381 307/24 |
| 2022/0094164 A1* | 3/2022 | Nakamura ........ | H02J 13/00016 |

* cited by examiner

*Primary Examiner* — Kidest Bahta

(57) ABSTRACT

The present disclosure provides systems and methods for providing power from an energy storage system (ESS). A method may include, for each of a plurality of energy storage units, calculating a length of time to complete discharge for the energy storage unit according to a rated power capacity of the energy storage unit and an amount of stored energy in the energy storage unit; determining a discharge control protocol for the plurality of energy storage units based on the calculated lengths of time to complete discharge, the discharge control protocol indicating a period of time to discharge power to an energy grid and an amount of power to discharge to the energy grid during the period of time; and discharging the plurality of energy storage units to the energy grid according to the discharge control protocol.

20 Claims, 9 Drawing Sheets

SYSTEMS AND METHODS FOR STATE-OF-CHARGE DEPENDENT CONTROL OF AN ENERGY STORAGE SYSTEM

BACKGROUND

Several industrial applications may implement the use of an energy storage system ("ESS") for the use of storing, and later providing, electrical energy. An ESS may include one or more transformers that enable the ESS to distribute large amounts of energy across transmission lines. Additionally, the ESS may be an ESS that includes multiple energy storage units for storing the energy. The ESS may be configured to provide energy to an energy grid to enable the energy grid to provide energy to other loads that require energy to operate.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

Figure 1A:
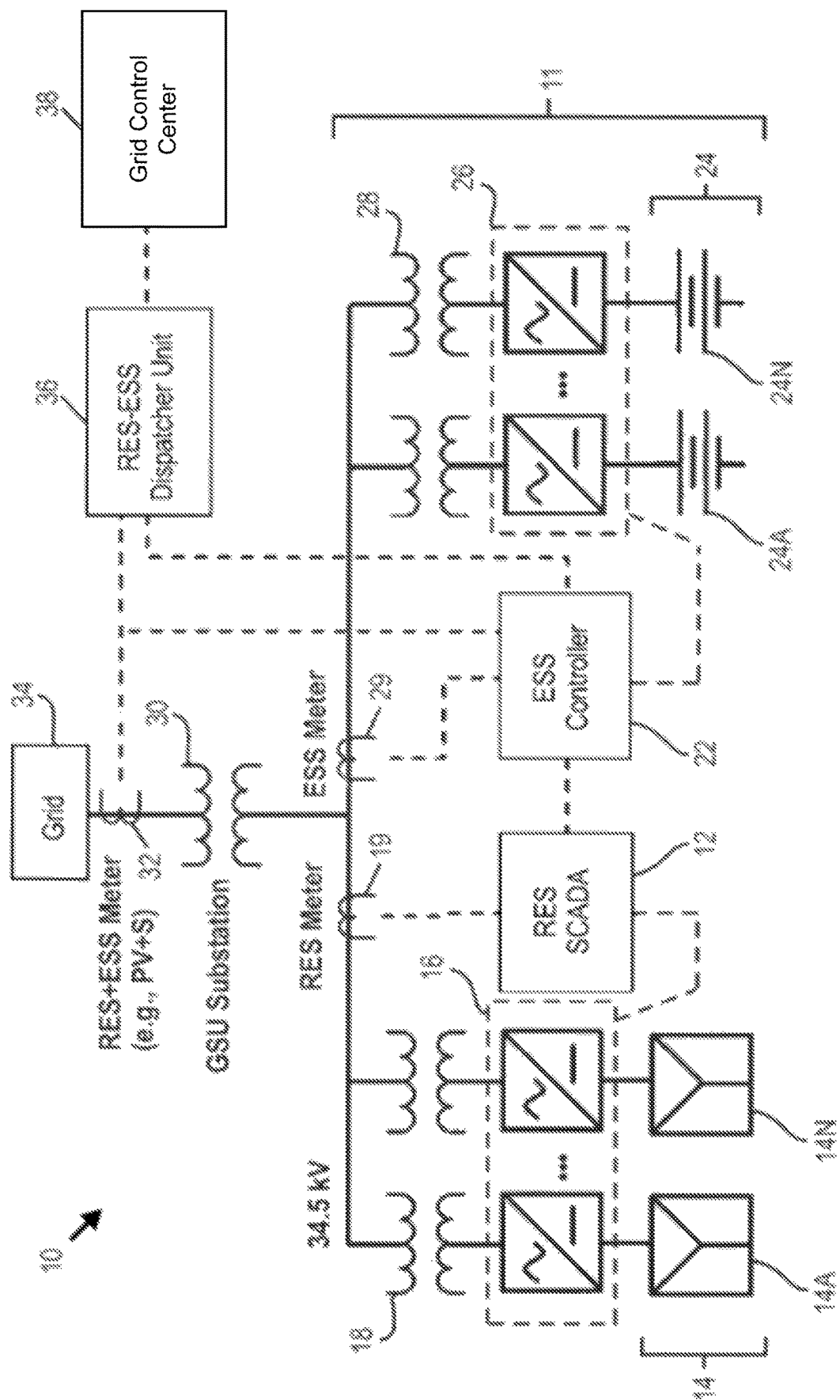
FIG. 1A is a schematic diagram of a metering and control system for controlling a renewable energy source and an energy storage system, according to some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

During operation, a ESS of a powerplant may receive one or more requests to supply power to an energy grid and/or submit bids to supply power to the energy grid. The ESS, or an operating system or controller associated with the ESS, may determine whether the ESS has sufficient power stored to satisfy the requests or how to formulate the bids. For example, the ESS may be rated to store a maximum amount of power based on how many energy storage units the ESS includes. Based on how much energy is stored in the ESS at any given time, the ESS can provide an amount of power for an amount of time equal to the total energy stored in the ESS over (e.g., divided by) the amount of power. For example, if a current energy of the ESS is 3.6 Giga Joules (GJ), the ESS can provide 1 Mega Watt (MW) of power for 1 hour (hr) (e.g., 3600 seconds (s)). However, in practice, the ESS may not be able to deliver power according to this expectation or it may be difficult to determine how much energy to commit in bids to the energy grid operator.

In some instances, different energy storage unit of the ESS can be at different states-of-charge (e.g., be partially charged or fully charged or otherwise store differing amounts of energy). Due to the potential differences in the states-of-charge, one energy storage unit may completely discharge sooner than another energy storage unit. Due to the imbalance in energy stored between the energy storage units, the ESS may overall include sufficient energy to supply the amount of power for the amount of time but can run out of energy in one or more energy storage units (e.g., while still having energy in another energy storage unit) before the amount of time transpires. Accordingly, the ESS may fail to satisfy the requests (e.g., the controller associated with the ESS may accept a request based on a total amount of energy stored in the ESS overall but be unable to satisfy the request). This may result in ineffective energy management, an inability to provide energy to other loads of the energy grid (e.g., leading to inoperability of the loads), and unreliable energy supply, among other deficiencies.

A processor implementing the systems and methods discussed herein may overcome the aforementioned technical deficiencies by generating a discharge control protocol for the discharge of power to an energy grid that accounts for different states-of-charge of energy storage units of a ESS. The discharge control protocol may indicate a period of time to discharge power to the energy grid and an amount of power to discharge to the energy grid during the period of time per energy storage unit of the ESS. To generate the discharge control protocol, the processor may calculate a length of time to discharge each energy storage unit of a ESS that includes multiple energy storage units. Based on each individual length of time, the processor may determine one or more potential discharge control protocols and select a discharge control protocol that satisfies a request to supply energy to the energy grid or to submit in a bid.

To calculate the respective lengths of time, the processor can determine respective levels of energy stored in each energy storage unit and power ratings for each energy storage unit. For example, the energy storage units may be of different sizes or capabilities such that each energy storage unit may be rated at varying max capacities of energy storage. Additionally, or alternatively, the energy storage units may be at varying states-of-charge (e.g., include varying levels of energy). The processor may determine a current amount of energy stored in a first energy storage unit and divide the amount by a rated power of the first energy storage unit to determine a length of time for the first energy storage unit to completely discharge (e.g., reach a zero amount of stored energy) at the rated power. In a similar manner, the processer can calculate each length of time to discharge for each energy storage unit.

To select a control protocol (e.g., from multiple potential control protocols that the processor determines based on the individual lengths of time), the processor can compare the energy supply request with the potential control protocols. In doing so, the processor can calculate maximum lengths of time the ESS can discharge at different power levels. For example, the processor may rank the lengths of time to discharge ESS (e.g., rank in descending order or ascending order). The processor may identify a longest time for the ESS to discharge at the full rated power level of the ESS based on a first length of time to discharge associated with the lowest value of the lengths of time for the individual energy storage units. For example, the first length of time may be associated with a first energy storage unit with the lowest amount of energy stored (e.g., smallest state-of-charge, smallest sized energy storage unit of the ESS). Because the first energy storage unit has the lowest amount of energy stored, the time it takes the first energy storage unit to discharge its stored energy may be the shortest length of time among all of the energy storage units.

The processor may further identify the different power levels for the ESS to discharge based on each of the lengths of time. For example, to calculate a first power level of a second length of time (e.g., a second ranked length of time or a second lowest length of time), the processor may combine, for each energy storage unit, a minimum value between the rated power of the energy storage unit and the amount of energy stored by the energy storage unit divided by the second length of time. For example, a second energy storage unit of the ESS may currently have a higher amount of energy stored than a first energy unit ESS. Thus, the second energy storage unit can discharge for a second length of time longer than the first energy storage unit. For the ESS to discharge for the second length of time, the first energy storage unit must discharge at a power level less than the rated power of the first energy storage unit. To determine the total power level that the ESS can discharge for the second length of time, for each energy storage unit, the processor can combine either (e.g., the minimum between) the rated power level of the energy storage unit or a power level less than the rated power if the energy storage unit will completely discharge before the second length of time has elapsed. To determine the power level less than the rated power, the processor can divide the amount of energy stored by the energy storage unit by the second length of time. Based on the power levels for each length of time, the processor may select a power level for a length of time that satisfies the request.

Advantageously, by performing the systems and methods described herein, the processor may improve the process of fulfilling energy supply requests from the energy grid. The processor may do so by determining more accurate power level and time data beyond the capability of a manual process to detect and process for effective completion of energy supply requests. By calculating varying periods of time that the ESS can fully discharge at varying power levels, a controller may ensure the ESS can supply energy to other loads of the energy grid for the full duration required by the loads and satisfy energy supply requests. This may result in improved reliability in energy supply and more efficient energy management, among other advantages.

Energy Management System

Figure 1B:
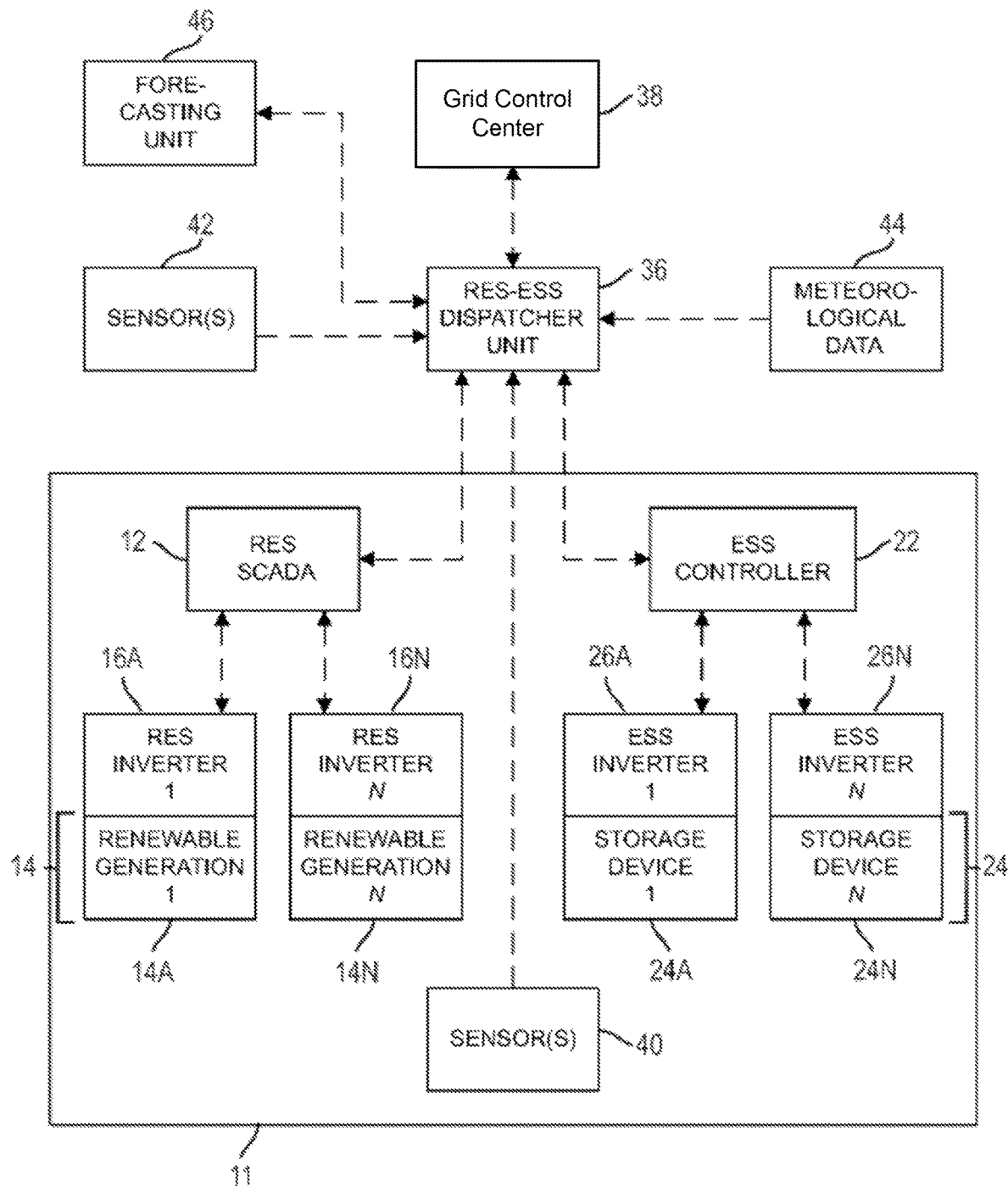
FIG. 1B is a schematic diagram showing certain components of the metering and control system of FIG. 1A, according to some embodiments.

Referring now to FIG. 1A, a schematic diagram showing interconnections between various components of an AC coupled metering and control system 10 for controlling a renewable electrical energy generation device 14 including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a RES–ESS facility 11 is shown, according to one embodiment. N can be any number. The N of the multiple generation units 14A-14N can be the same as or different from the N of the multiple energy storage units 24A-24N. The RES–ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure. While the examples illustrated in FIGS. 1A and 1B are indicative of a RES–ESS facility, it is to be understood that the techniques as described herein can apply to other facilities that include an ESS system (e.g., there is no RES or the energy source is non-renewable).

FIG. 1A illustrates an RES–ESS facility 11 that uses inverters 16, 26 to convert DC power produced by a renewable electrical energy generation device 14 (e.g., a PV array in certain embodiments) or power released by the energy storage device 24 to AC power for coupling to an AC electrical grid 34. In certain embodiments, the RES–ESS facility 11 may embody a DC coupled RES–ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one electrolysis unit (e.g., configured to electrolyze water to release hydrogen) and a hydrogen storage unit (e.g., adsorbent media for releasably binding hydrogen, hydrogen storage vessels, and/or reversible chemical reactant vessels or beds). In certain embodiments, an energy storage device 24 may include electrical charge storage devices such as batteries, optionally augmented with capacitors.

In certain embodiments, a RES–ESS dispatcher unit 36 has the ability to control the charge or discharge of the energy storage device 24 (e.g., batteries) by communicating with an ESS controller 22. The ESS controller 22 may be located in the RES–ESS facility 11. A RES SCADA (supervisory control and data acquisition) controller 12 may be operatively coupled with RES inverters 16 associated with the renewable electrical energy generation device 14 (optionally embodied in a PV array), and the ESS controller 22 may be operatively coupled with ESS inverters 26 associated with the energy storage device 24. Both the RES SCADA controller 12 and the ESS controller 22 may be in communication with the RES–ESS dispatcher unit 36. In certain embodiments, a grid control center 38 (e.g., of an electric power utility or grid operator) may communicate with the RES–ESS dispatcher unit 36 using DNP3 and set different configuration options. Additionally, the RES–ESS dispatcher unit 36 may receive or generate an accurate renewable generation forecast (e.g., solar generation forecast).

As shown in FIG. 1A, certain embodiments may utilize readily available electric power meters, such as a RES+ESS electrical power meter 32 to measure RES–ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES–ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations).

Referring now to FIG. 1B, a schematic diagram showing certain components of the AC coupled metering and control system of FIG. 1A, including interconnection of control- and sensor-related components is shown, according to one embodiment. As shown in FIG. 1B, the RES–ESS dispatcher unit 36 may be arranged between a grid control center 38 and a RES–ESS facility 11. Within the RES–ESS facility 11, a RES SCADA controller 12 may be operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES–ESS facility 11, an ESS controller 22 may be operatively coupled with ESS inverters 26A-26N that are configured to provide AC conversion of DC power supplied by energy storage units 24A-24N (e.g., arrangeable as parts of an energy storage device 24). The RES–ESS facility 11 may further include at least one sensor 40, which may comprise one or more sky imaging sensors useful to determine sky conditions (such as the presence of clouds or lack thereof) proximate to the RES–ESS facility 11, with output signals from the at least one sensor 40 being supplied to the RES–ESS dispatcher unit 36. The RES–ESS dispatcher unit 36 may also receive: (i) signals from one or more sensors 42 (e.g., satellite imaging sensors or the like) not necessarily associated with the RES–ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES–ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2A:
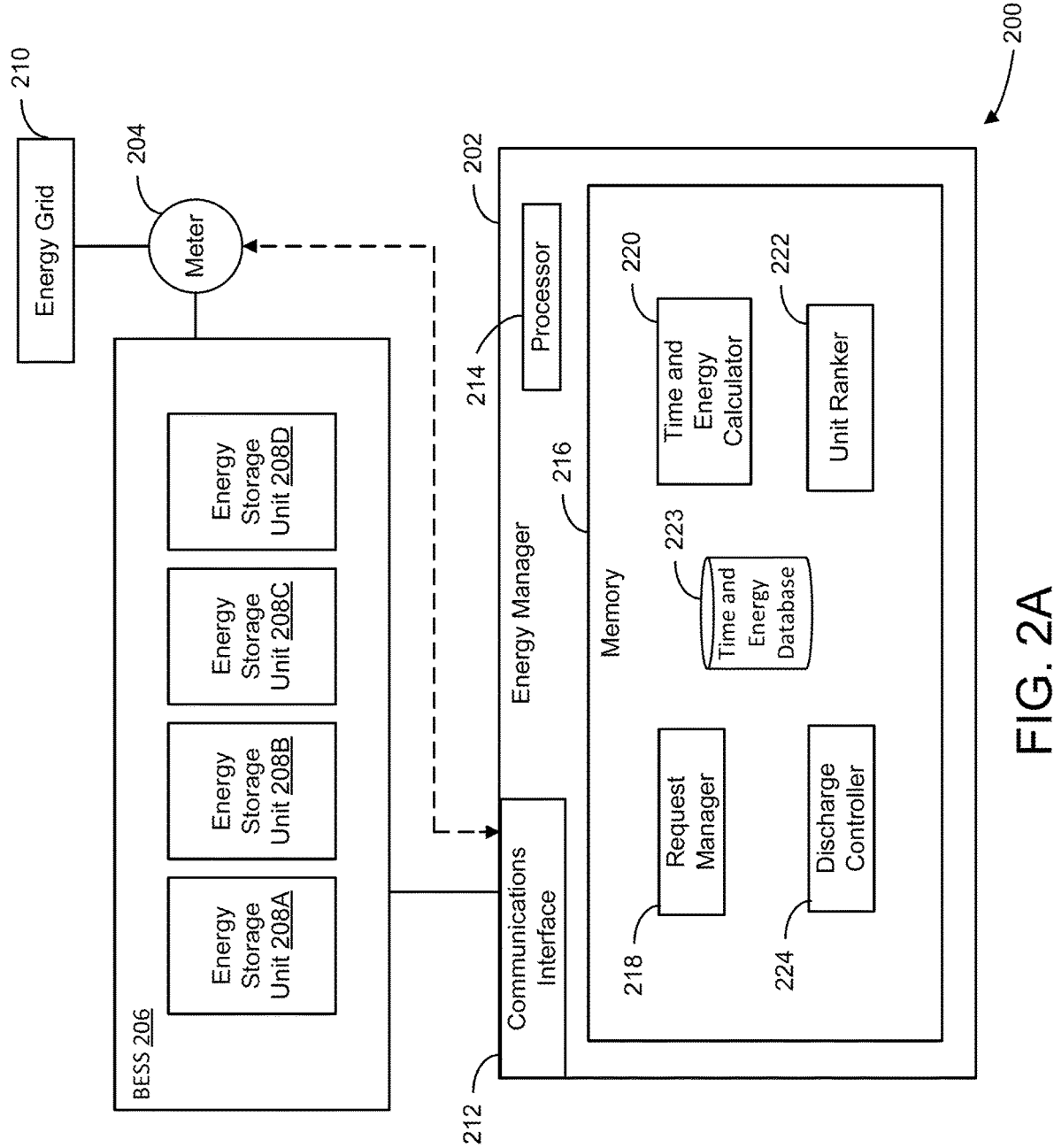
FIGS. 2A-C illustrate a system for state-of-charge dependent control of an energy storage system (ESS), according to some embodiments.
Figure 2B:
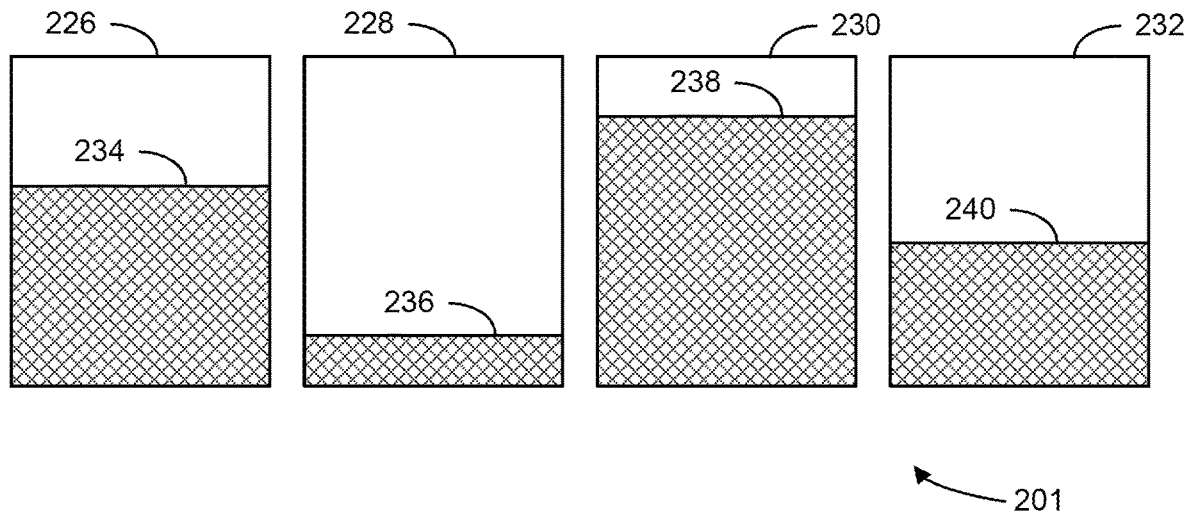
Figure 2C:
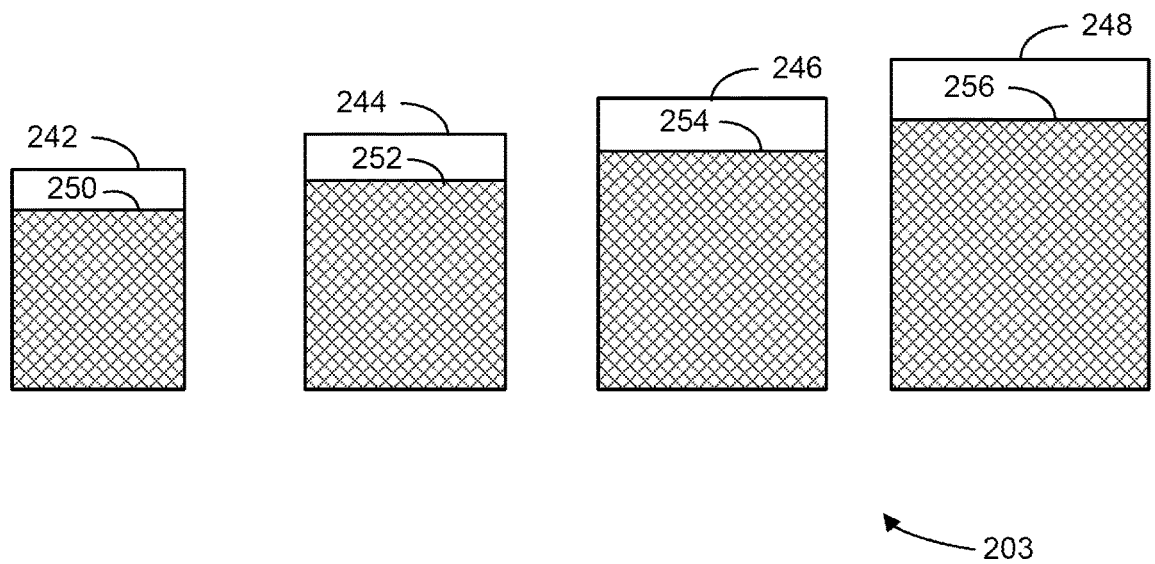

Referring now to FIGS. 2A-C, systems 200, 201, and 203 for state-of-charge dependent control of a ESS are described, in accordance with some embodiments of the present disclosure. In brief overview, the system 200 can include an energy manager 202 that can communicate with a meter 204 and/or a ESS 206. In some cases, the energy manager 202 can further communicate with a renewable energy source (RES). The ESS 206 may include energy storage units 208*a-d* (individually, energy storage unit 208, and collectively, energy storage units 208). Energy storage units 226, 228, 230, 232, 242, 244, 246, and 248, depicted in FIGS. 2B and 2C, may be examples of energy storage units 208. The system 200 may include more, fewer, or different components than shown in FIG. 2. These components may operate together to receive and fulfill one or more energy supply requests from an energy grid 210. For example, the energy grid 210 may manage the supply of energy to multiple loads that require energy to operate. A controller of the energy grid 210 may determine a need to supply an amount of power to one or more of the loads. In some cases, the controller may determine a period of time associated with the amount of power to supply the power to the loads. The controller of the energy grid 210 may send, in some cases responsive to the determination, a request to the energy manager 202 indicating the required amount of power and the period of time.

The meter 204 may be or include an energy meter or meter that is configured to read the amount of energy that is provided from the ESS 206 to the energy grid 210 and the amount the energy grid 210 provides back through the meter 204. The meter 204 may generate positive readings when energy is flowing to the energy grid 210 and negative values when the meter 204 reads energy flowing from the energy grid, or vice versa. The meter 204 may be similar to or the same as the ESS electrical power meter 29, shown and described with reference to FIG. 1A.

The ESS 206 may be a battery energy storage within the system 200. The ESS 206 may charge and/or discharge according to a charge/discharge schedule. The ESS 206 may be charged with energy from the energy grid 210 and/or renewable energy sources within a renewable energy facility. The ESS 206 may also operate to provide energy to the energy grid 210. The ESS 206 may store energy in energy storage units 208 (e.g., energy storage units 24, shown and described with reference to FIGS. 1A and 1B). The ESS 206 may include one or more inverters and/or transformers to enable the ESS 206 to provide energy to the energy grid 210.

The ESS 206 may include multiple energy storage units 208. For example, the ESS 206 may include a first energy storage unit 208A, a second energy storage unit 208B, a third energy storage unit 208C, and a fourth energy storage unit 208D. Each energy storage unit may have a maximum rated power capacity ($P_{rated_i}$), a nominal duration ($D_{nom_i}$), and an energy storage capacity ($E_{cap_i}$) that may be defined according to the following equations:

$$E_{cap_i} = D_{nom_i} \times P_{rated_i} \qquad \text{Equation 1}$$

$$D_{nom_i} = \frac{E_{cap_i}}{P_{rated_i}} \qquad \text{Equation 2}$$

where i indicates the number (e.g., identification) of the energy storage unit 208 starting at 1 and going to n, where n is the number of energy storage units 208 in the ESS 206 (e.g., 4). While the examples given in FIGS. 2A-C include a ESS 206 with four energy storage units 208, a ESS 206 including other numbers of energy storage units 208 is considered and supported by the techniques as described herein.

The ESS 206 may be rated to output an amount of power and be able to store an amount of energy based on the number of energy storage units 208 included in the ESS 206. For example, the rated power may be defined according to the following equation:

$$P_{rated\_BESS} = \Sigma_1^n P_{rated_i} \quad \text{Equation 3}$$

The energy capacity of the ESS 206 may be defined according to the following equation:

$$E_{cap\_BESS} = \Sigma_1^n E_{cap} \quad \text{Equation 4}$$

Thus, a nominal duration of the ESS 206 may be defined according to the following equation:

$$D_{BESS} = \frac{E_{cap\_BESS}}{P_{rated\_BESS}} \quad \text{Equation 5}$$

Based on the amount of power indicated in the request from the energy grid 210, the energy manager 202 may determine a length of time (e.g., a period of time, a time value) that the ESS 206 can provide the requested (e.g., required) power. For example, for a given power requirement ($P_{req}$), an expectation for power delivery from the ESS 206 may be that the required power could be delivered for a length of time given by the following equation (e.g., an equation representing a simple expectation):

$$T(P_{req}) = \frac{E_{BESS}}{P_{req}} \quad \text{Equation 6}$$

given that the required power is less than or equal to the rated power of the ESS 206 ($P_{req} \leq P_{rated\_BESS}$) and the energy of the ESS 206 is less than or equal to the energy capacity of the ESS 206 ($E_{BESS} \leq E_{cap\_BESS}$). For any value of $E_{BESS}$, $T(P_{req})$ may have a lower limit defined by $$\frac{E_{BESS}}{P_{rated\_BESS}}$$

and for any allowed value of $P_{req}$ (e.g., $P_{req} \leq P_{rated\_BESS}$), $T(P_{req})$ may have an upper limit defined by $$\frac{E_{cap\_BESS}}{P_{req}}.$$

$E_{BESS}$ is the total energy stored in the ESS 206 and may be defined by the following equation:

$$E_{BESS} = \Sigma_1^n E_i \quad \text{Equation 7}$$

However, the expectation provided by Equation 6 may be a simple expectation for a ESS that does not account for multiple energy storage units 208. For example, each energy storage unit 208 can include a respective state of charge ($SOC_i$) defined by the following equation:

$$SOC_i = E_i / E_{cap_i} \quad \text{Equation 8}$$

where $E_i$ is the energy stored in the energy storage unit i given that $E_i < E_{cap_i}$. Because the SOC values of each individual energy storage unit 208 can be a different value, the ESS 206 may deliver (e.g., provide, send) power different from the expectation provided by Equation 6.

For example, in FIG. 2B, a first energy storage unit 226 may have a first SOC value 234 (e.g., 60%), a second energy storage unit 228 may have a second SOC value 236 (e.g., 20%), a third energy storage unit 230 may have a third SOC value 238 (e.g., 80%), and a fourth energy storage unit 232 may have a fourth SOC value 240 (e.g., 40%). If each energy storage unit 226, 228, 230, 232 has a same energy capacity (e.g., 43.2 GJ), then the ESS 206 may be storing a total of 86.4 GJ (e.g., 60%+40%+80%+20%=200% of 43.2 GJ) and, according to Equation 6, the ESS 206 can provide power to the energy grid 210 for 6 hours at a power limit or output of 1 MW per energy storage unit (e.g., 86.4 GJ/14 MW=21,600 s or 6 hrs). However, the second energy storage unit 228 outputting 1 MW per hour—having the second SOC value 236 (e.g., 20% of 43.2 GJ=8.64 GJ)—can only output power at 1 MW for 2.4 hours (e.g., 8.64 GJ/1 MW=8640 s or 2.4 hrs). If a controller of the ESS 206 accepted a request to provide 4 MW of power for 6 hours, based on the expectation of Equation 6, then the ESS 206 may fail to fulfill the request after 2.4 hours (e.g., the output of the ESS 206 may drop below the 4 MW required power to 3 1 MW without the second energy storage unit 228).

If each SOC value is equal to each other but nominal duration values of each energy storage unit 208 include different values, then the ESS 206 may deliver power different from the expectation provided by Equation 6. For example, in FIG. 2C, a fifth energy storage unit 242 may have a first energy storage capacity (e.g., size), a sixth energy storage unit 244 may have a second energy storage capacity, a seventh energy storage unit 246 may have a third energy storage capacity, and an eight energy storage unit 248 may have a fourth energy storage capacity, where each energy storage unit 242, 244, 246, and 248 may include respective SOCs 250, 252, 254, and 256 each equal to 80%. At least one of the first, second, third, or fourth energy storage capacities being different from one other capacity. Due to the difference in capacities (despite a same SOC of 80%), the fifth energy storage unit 242 may completely discharge (e.g., release all stored energy) faster than the other energy storage units 244, 246 and 248, if energy storage units 242-248 are discharged at similar power levels. Thus, if the ESS 206 accepted a request to provide an amount of power for a period of time to the energy grid 210, based on the simple expectation of Equation 6, then the ESS 206 may fail to fulfill the request after a second period of time less than the period of time (e.g., the output of the ESS 206 may drop below the amount of power required without power from the fifth energy storage unit 242).

The energy manager 202 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The energy manager 202 can include or utilize at least one processing unit or other logic device such as a programmable logic array engine or a module configured to communicate with one another or other resources or databases. The components of the energy manager 202 can be separate components or a single component. The system 200 and its components can include hardware elements, such as one or more processors, logic devices, or circuits.

The energy manager 202 may comprise one or more processors that are configured to control charging and/or discharging of the second ESS 206 to provide energy to the energy grid 210. The energy manager 202 may comprise a communications interface 212, a processor 214, and/or memory 216. The energy manager 202 may communicate with the meter 204 and/or the ESS 206 via the communications interface 212 (e.g., an application programming interface (API)). The processor 214 may be or include an ASIC, one or more FPGAs, a DSP, circuits containing one or more processing components, circuitry for supporting a microprocessor, a group of processing components, or other suitable electronic processing components. In some embodiments, the processor 214 may execute computer code or modules (e.g., executable code, object code, source code, script code, machine code, etc.) stored in the memory 216 to facilitate the activities described herein. The memory 216 may be any volatile or non-volatile computer-readable storage medium capable of storing data or computer code.

The memory 216 may include a request manager 218, a time and energy calculator 220, a unit ranker 222, a time and energy database 223, and a discharge controller 224. In brief overview, the components 218-224 may cooperate to control the ESS 206 dependent on SOCs and/or current energy levels of energy storage units of the ESS 206 to ensure the power and time requirements of the energy grid 210 are satisfied. The components 218-224 may determine how long (e.g., respective lengths of time) it would take to discharge each of the energy storage units 208. Upon making such a determination, the components 218-224 may identify a rank for each of the respective lengths of time (e.g., order the respective lengths of time based on value). The components 218-224 may determine a discharge control protocol for discharging each of the energy storage units 208 to the energy grid 210 based on one or more requests to supply power to the energy grid 210. The components 218-224 may direct identified amounts of power from each of the energy storage units 208 to the energy grid 210 for a period of time in compliance with the discharge control protocol.

The energy manager 202 may receive a request (e.g., a discharge request, and energy supply request) from the energy grid 210 (e.g., a controller of the energy grid 210) via the communications interface 212. The request manager 218 may comprise programmable instructions that, upon execution, cause the processor 214 to process the request. The request may indicate a power requirement (e.g., an amount of power to discharge to the energy grid 210) and/or a period of time (e.g., a length of time to discharge to the energy grid 210). The request manager 218 may determine the power requirement or the period of time and communicate the data to the energy manager 202.

The time and energy calculator 220 may comprise programmable instructions that, upon execution, cause the processor 214 to calculate, for each of the energy storage units 208, a length of time to complete discharge for the energy storage unit 208 according to a rated power capacity of the energy storage unit 208 and an amount of stored energy in the energy storage unit 208. For example, the time and energy calculator 220 may calculate the lengths of time based on the following equation:

$$T_i = \frac{E_i}{P_{rated_i}} \quad \text{Equation 9}$$

where each energy storage unit 208 (i) has a maximum rated power capacity ($P_{rated_i}$) and a current amount of energy stored ($E_i$). The lengths of time may include seconds, minutes, hours, or days based on the amount of energy stored and the rated power capacity. In some cases, each length of time may be the same or different based on the respective SOC and nominal durations of each energy storage unit (e.g., as described in FIGS. 2A and 2B).

The unit ranker 222 may comprise programmable instructions that, upon execution, cause the processor 214 to rank the lengths of time or the energy storage units 208 according to the lengths of time. The ranking may be based on ascending or descending ranking (e.g., lowest to highest ranking, a highest to lowest ranking). The unit ranker 222 may determine which energy storage unit 208 is associated with a smallest length of time. For example, the unit ranker 222 may determine the energy storage unit 242 (i=1) is associated with the lowest $T_i$ value (i.e., $T_{i_1}=T_1$), the energy storage unit 244 (i=2) is associated with the second lowest $T_i$ value (i.e., $T_{i_2}=T_2$),), the energy storage unit 246 ($i_3$) is associated with the second highest $T_i$ value (i.e., $T_{i_3}=T_3$),), and the energy storage unit 248 ($i_4$) is associated with the highest $T_i$ value (i.e., $T_{i_4}=T_4$). The lowest length of time value, $T_{i_1}$, may define the longest time for which all of the energy storage units 208 (e.g., 242, 244, 246, and 248) can discharge at their respective rated power levels (e.g., the longest time the ESS 206 can discharge at its full rated power). For example, because the energy storage unit 242 will completely discharge first, based on $T_{i_1}$, then any amount of time after $T_{i_1}$ the ESS 206 may use one less energy storage unit 208 and the power output by the ESS 206 may decrease (e.g., by the rated power capacity of the energy storage unit 242).

The unit ranker 222 may store the lengths of time and the power outputs of the ESS 206 associated with the lengths of time in the time and energy database 223. The database 223 may be a relational database, cloud database, or other type of database 223 that can store time and power data. For example, a data point in the database 223 may indicate $T_{i_1}$ and $P_{rated\_BESS}$ at $T_{i_1}$ (e.g., $\{P_{rated\_BESS}, T_{i_1}\}$). The unit ranker 222 may determine (e.g., define, calculate) the next length of time ($T_{i_2}$). For example, while the energy storage unit 242 may not discharge for $T_{i_2}$ at its rated power, the energy storage unit 242 may discharge for $T_{i_2}$ at a lower power level $$(P_{i_{1_2}}),$$

which can be defined according to the following equation:

$$P_{i_{1_2}} = \frac{E_{i_1}}{T_{i_2}} \quad \text{Equation 10}$$

Because all other energy storage units can discharge for at least $T_{i_2}$, the ESS 206 can discharge for a duration equal to $T_{i_2}$ with a power output of the rated power of the ESS 206 minus the rated power $P_{i_1}$ of the energy storage unit 242 plus the lower power level $$P_{i_{1_2}}$$

of the energy storage unit 242. To generalize, the unit ranker 222 may calculate power outputs for each length of time based on the following equation:

$$P_{BESS}(T_{i_m}) = \sum_1^n \min\left(P_{rated_i}, \frac{E_i}{T_{i_m}}\right) \quad \text{Equation 11}$$

where n is the number of energy storage units 208 in the ESS 206 and the summation is across the is. The value $i_m$ is a constant with respect to the summation and is the unit number of the energy storage unit ranked at position m by the unit ranker.

Figure 2D:
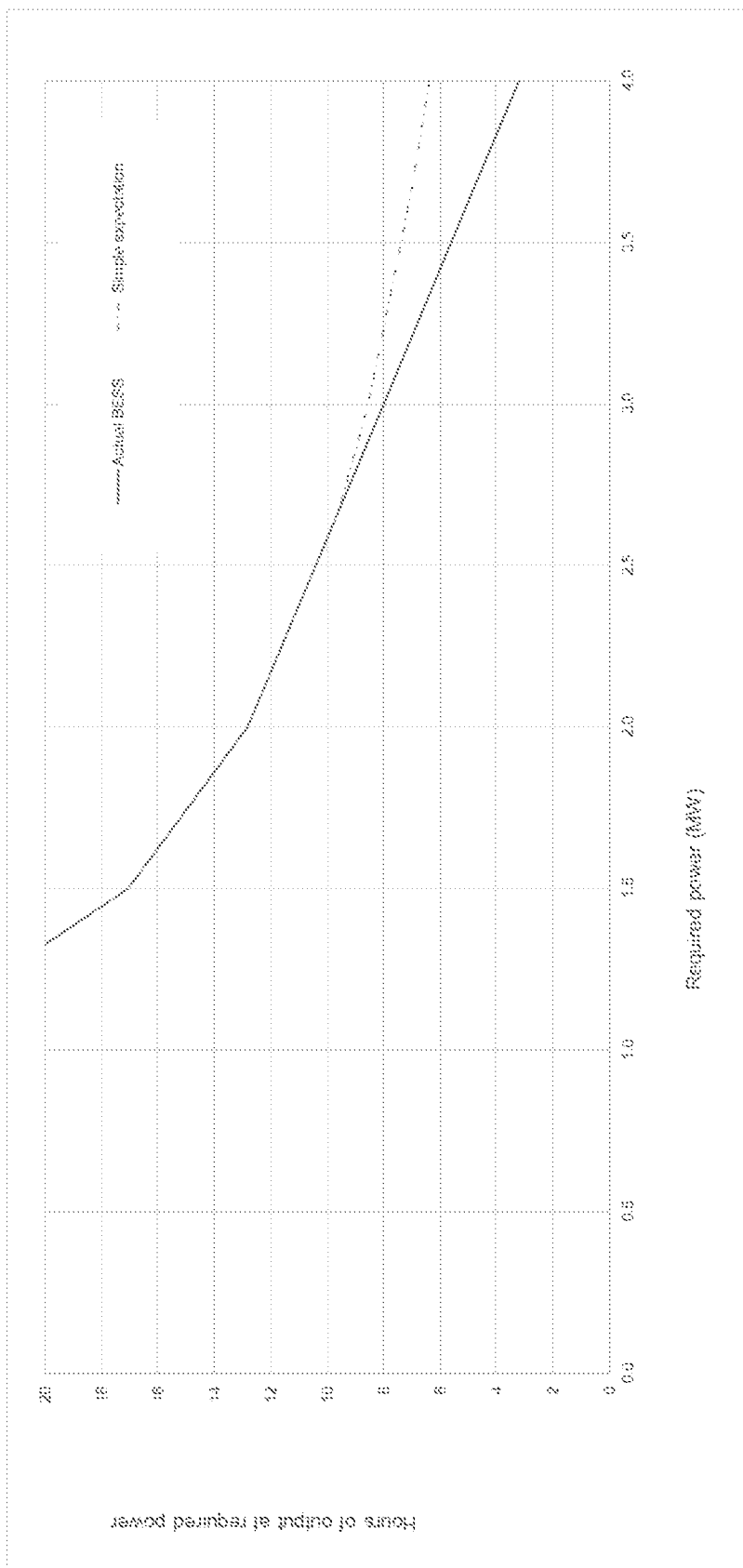
FIGS. 2D-E illustrate charts for state-of-charge dependent control of an energy storage system (ESS), according to some embodiments.
Figure 2E:
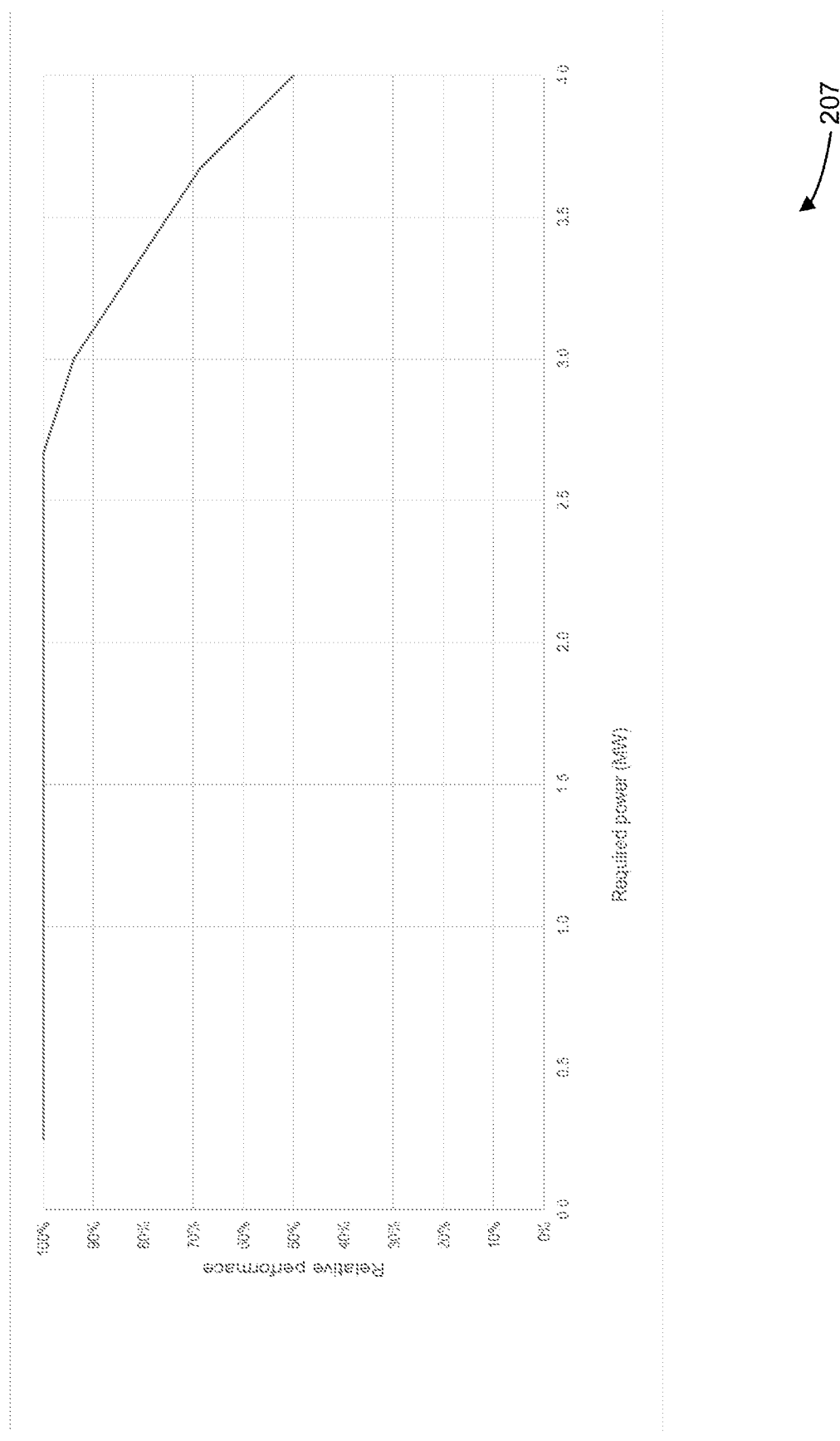

In some embodiments, the energy manager 202 may present the data stored in the time and energy database 223. For example, as illustrated in FIG. 2D, the energy manager 202 may generate a chart 205 with $P_{req}$ on the x-axis and $T_i$ on the y-axis. The chart may include points for each length of time corresponding to the respective power output of the ESS 206 at that time. The energy manager 202 may present the chart 205 to one or more users via a screen or other medium that can indicate the chart 205. In some embodiments, the chart 205 may have a 1/x behavior (e.g., at low values of $P_{req}$) that may lead to very high values of $T(P_{req})$, causing the chart 205 to span a large range on the y-axis and making the chart 205 difficult to interpret by users (e.g., distinguish a deviation of the actual performance of the ESS 206 and the performance based on the simple expectation). Thus, the energy manager 202 may calculate a relative performance metric $PR(P_{req})$ that may be defined by the following equation:

$$PR(P_{req}) = \frac{T(P_{req})}{T_{simple}(P_{req})} \quad \text{Equation 12}$$

where $T_{simple}(P_{req})$ is the discharge time calculated using the simple expectation formula, and $T(P_{req})$ is the maximum time the ESS can actually discharge at the required power level. In the example of FIG. 2E, the energy manager 202 may present a chart 207 including the relative performance metric to the one or more users via the screen or other medium.

The discharge controller 224 may comprise programmable instructions that, upon execution, cause the processor 214 to determine a discharge control protocol for the energy storage units 208. The discharge control protocol may indicate a period of time to discharge power to the energy grid and an amount of power to discharge to the energy grid during the period of time. In some embodiments, the discharge control protocol may indicate respective periods of time and/or respective amounts of power for each energy storage unit 208. For example, based on the required power and/or period of time, T, indicated by the energy supply request received from the energy grid 210 and the data points stored in the time and energy database, the discharge controller 224 may select a power output $P_i$ corresponding to time T for each energy storage unit 208 that satisfies the required power and/or time T. The discharge controller 224 may operate the energy storage units 208 to discharge to the energy grid 210 according to the discharge control protocol.

Figure 3:
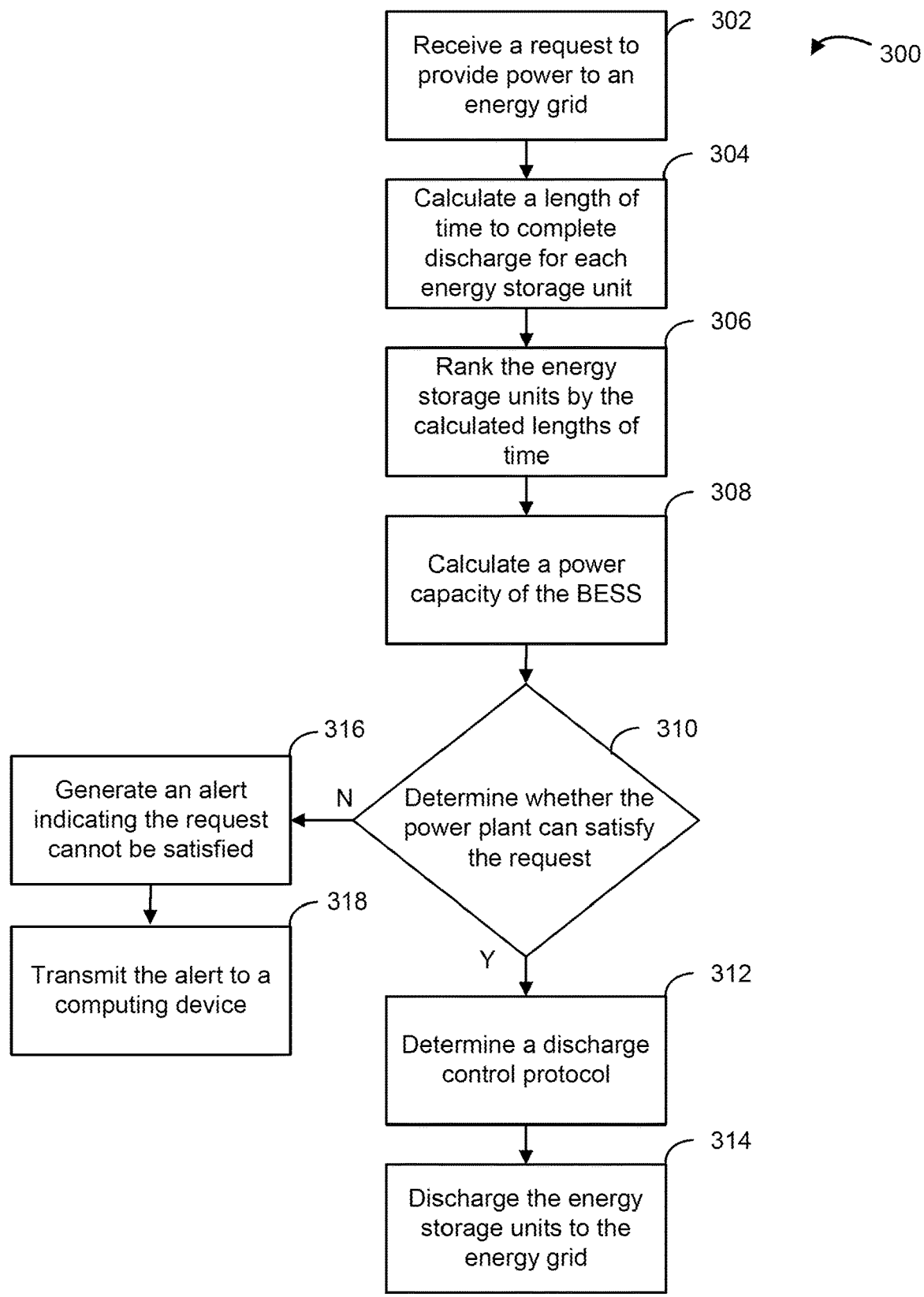
FIG. 3 illustrates a flowchart of an example method for state-of-charge dependent control of an energy storage system (ESS), according to some embodiments.

FIG. 3 illustrates a method 300 for SOC dependent control of a ESS, according to some embodiments. The method 300 can be performed by a data processing system (e.g., a controller, the RES–ESS dispatcher unit 36, the ESS controller 22, the RES SCADA controller 12, the energy manager 202, etc.). In some embodiments, the data processing system is the controller of a renewable energy plant that contains a ESS. The data processing system may operate to provide power to an energy grid in response to an energy supply request or otherwise to satisfy a power purchase agreement (PPA). The data processing system may do so to ensure loads (e.g., devices) coupled with the energy grid may be sufficiently powered. Performance of method 300 may enable the data processing system to calculate more accurate power and time data and generate a discharge control protocol to reliably fulfill the energy supply request. Accordingly, performance of the method 300 may enable for more effective energy management, more reliable energy supply, and a more efficient process for fulfilling energy supply requests, among other advantages. The method 300 may include more or fewer operations and the operations may be performed in any order.

At operation 302, the data processing system receives a discharge request to discharge power to an energy grid. The discharge request can indicate a length of time to discharge energy from multiple energy storage units of a ESS to the energy grid. In some embodiments, a renewable energy powerplant including the ESS may be coupled to the energy grid to provide energy to the energy grid. Each energy storage unit of the ESS may include an amount of stored energy. In some embodiments, a first energy storage capacity of a first energy storage unit of the energy storage units is different from a second energy storage capacity of a second energy storage unit of the energy storage units. In some embodiments, a first amount of energy stored in the first energy storage unit of the energy storage units is different from a second amount of energy stored in the second energy storage unit of the energy storage units.

At operation 304, the data processing system calculates, for each of the energy storage units, a length of time to complete discharge for the energy storage unit. The data processing system can calculate the lengths of time according to a rated power capacity of each respective energy storage unit and an amount of stored energy in the energy storage unit. For example, the data processing system may use Equation 9 to determine the lengths of time, or another similar equation based on the rated power and stored energy of an energy storage unit.

At operation 306, the data processing system ranks the energy storage units according to the calculated lengths of time to complete discharge of each energy storage unit. Based on the ranking, the data processing system can determine a length of time from the calculated lengths of time associated with completing discharge for each of the energy storage units (e.g., $T_{i_j}$).

At operation 308, the data processing system calculates, for each of the energy storage units, a power capacity of the energy storage unit according to the amount of energy stored in the energy storage unit. For example, the data processing system may calculate the power capacity of each energy storage unit based on Equation 10, or a similar equation. The data processing system calculates, for each of the energy storage units, a minimum power capacity between the rated power capacity of the energy storage unit and the calculated power capacity of the energy storage unit. For example, the data processing system may calculate the minimum based on Equation 11 (e.g., the min( ) operator of Equation 11). The data processing system combines the minimum for each energy storage unit to calculate a power capacity of the ESS. For example, the data processing system may calculate the power capacity of the ESS for each calculated length of time based on Equation 11, or a similar equation. The power capacities of the ESS may be less than a rated power capacity of the ESS. In some embodiments, the data processing system may calculate a second length of time to complete discharge for the ESS according to a rated power capacity of the ESS and an amount of energy stored in the ESS (e.g., based on a simple expectation, Equation 6). The data processing system may compare the second length of time to the calculated lengths of time.

At operation 310, the data processing system determines whether the renewable energy powerplant can satisfy the discharge request. To do so, the data processing system may determine a power requirement to discharge energy from the energy storage units to the energy grid based on the calculated power capacities of the ESS (e.g., the combination of the minimums in Equation 11). For example, the data processing system may determine whether the indicated power level (e.g., the power required by the energy grid, the power requirement) corresponds to a power capacity of the calculated power capacities of the ESS (e.g., is less than or equal to one or more of the calculated power capacities). In some embodiments, the data processing system may determine whether the indicated length of time (e.g., the length of time to provide power to the energy grid) is greater than a lowest length of time of the calculated lengths of time and less than a greatest length of time of the calculated lengths of time (e.g., is within the range of the calculated lengths of time, satisfies a threshold length of time). If the discharge request indicates both a required power level and a length of time to provide the required power level, the data processing system may determine whether the required power level and the length of time correspond (e.g., map) to a data point including a calculated length of time and a power capacity of the ESS (e.g., a data point stored in the database 223). To do so, in some embodiments, the data processing may generate a regime (e.g., a subset of a power-time graph) defined by the calculated data points. The data processing system may determine whether a required power level and length of time map to a point either within the regime or outside the regime. If the mapping is inside the regime, the data processing system may determine the ESS can deliver the required power level for the length of time. If the mapping is outside the regime, the data processing system may determine the ESS cannot deliver the required power level for the length of time. If the indicated length of time and/or the indicated power level do not satisfy the threshold length of time or power level, the data processing system can, at operation 316, generate an alert indicating the discharge request cannot be satisfied. At operation 318, the data processing system can transmit the alert to a computing device (e.g., a cloud network, a remote network, a controller associated with the energy grid, a controller associated with the ESS). For example, the data processing system may transmit the alert to an energy grid controller to notify the energy grid controller that one or more discharge requests cannot be met. If the indicated length of time and/or the indicated power level satisfy the threshold length of time or power level, the method 300 may continue to operation 312.

At operation 312, the data processing system determines a discharge control protocol for the energy storage units. The discharge control protocol may be based on the calculated lengths of time to complete discharge. The discharge control protocol may indicate a period of time to discharge power to the energy grid and an amount of power to discharge to the energy grid during the period of time. For example, the data processing system may determine, for each energy storage unit, a power level to discharge power and a length of time (or multiple lengths of time) to discharge the power at the power level based on satisfying the power requirement for the required length of time indicated by the discharge request. At operation 314, the data processing system discharges the energy storage units to the energy grid according to the discharge control protocol (e.g., at the determined amount for each energy storage unit for the determined period of time).

In a non-limiting example, the data processing system may receive a discharge request to discharge 3 MW of power to the energy grid. The data processing system may calculate a length of time to complete discharge for each energy storage unit. The ESS may include four energy storage units having a same energy capacity of 43.2 GJ with a power limit of 1 MW per energy storage unit, where a first energy storage unit has a first SOC value of 60% (e.g., a current energy level of 25.92 GJ), a second energy storage unit has a second SOC value of 20% (e.g., a current energy level of 8.64 GJ), a third energy storage unit has a third SOC value of 80% (e.g., a current energy level of 34.56 GJ), and a fourth energy storage unit has a fourth SOC value of 40% (e.g., a current energy level of 17.28 GJ), similar to the example as described herein with reference to FIG. 2B. The data processing system may calculate a first length of time associated with the first energy storage unit to be 7.2 hrs, a second length of time associated with the second energy storage unit to be 2.4 hrs, a third length of time associated with the third energy storage unit to be 9.6 hrs, and a fourth length of time associated with the fourth energy storage unit to be 4.8 hrs. The data processing system may rank the lengths of time (e.g., in the order of the second length of time, the fourth length of time, the first length of time, the third length of time); thus, $T_{i_1}=T_2=2.4$ hrs, $T_{i_2}=T_4=4.8$ hrs, $T_{i_3}=T_1=7.2$ hrs, and $T_{i_4}=T_3=9.6$ hrs.

The data processing system may calculate a power capacity of the ESS for each length of time based on a minimum value between a rated power capacity of the energy storage units (e.g., 1 MW) and a power capacity of the energy storage units based on current energy levels (e.g., based on SOC values). To do so, the data processing system may use Equation 11, where $T_{i_m}$ is the associated length of time, $P_{rated_i}$ is 1 MW, and $E_i$ is the current energy level of the energy storage unit i. For example, a first power capacity associated with the second length of time ($T_{i_1}=T_2=2.4$ hrs) may be 4 MW (e.g., 1 MW+1 MW+1 MW+1 MW), a second power capacity associated with the fourth length of time ($T_{i_2}=T_4=4.8$ hrs) may be 3.5 MW (e.g., 1 MW+0.5 MW+1 MW+1 MW), a third power capacity associated with the first length of time ($T_{i_3}=T_1=7.2$ hrs) may be 3 MW (e.g., 1 MW+0.3334 MW+1 MW+0.6667 MW), and a fourth power capacity associated with the third length of time ($T_{i_4}=T_3=9.6$ hrs) may be 2.5 MW (e.g., 0.75 MW+0.25 MW+1.00 MW+0.50 MW). The data processing system may determine that the ESS may satisfy the discharge request of 3 MW based on calculating the third power capacity (e.g., 3 MW). The data processing system may indicate (e.g., transmit an indication, notify) to a controller of the energy grid that the ESS can provide 3 MW of power (e.g., the third power capacity) for up to 7.2 hrs (e.g., the first length of time associated with the third power capacity) to the energy grid or otherwise indicate that the ESS can satisfy the discharge request. The data processing system may determine or generate a discharge control protocol that is configured to discharge the 3 MW of power for the 7.2 hrs. In doing so, the data processing system may determine or generate the discharge control protocol to include an indication for the first energy storage unit to provide 1 MW of power, an indication for the second energy storage unit to provide 0.3334 MW of power, an indication for the third energy storage unit to provide 1 MW of power, and an indication for the fourth energy storage unit to provide 0.6667 MW of power, each for 7.2 hrs.

In another non-limiting example, the discharge request may indicate to discharge 2.9 MW. The data processing system may determine that 2.9 MW is less than 3 MW but more than 2.5 MW, such that the ESS can discharge for a period of time greater than 7.2 hrs but less than 9.6 hours. For any requested power between 2.5 MW and 3 MW the first, second, and fourth energy storage units vary their respective discharge power and duration while the third energy storage unit holds steady at 1 MW. At a total power of 2.5 MW, the first, second, and fourth energy storage units together provide 1.5 MW (e.g., 2.5 MW-1 MW). The data processing system may determine to have a total power of 2.9 MW, the first, second, and fourth energy storage units together provide 1.9 MW. The data processing system may determine the first, second, and fourth energy storage units can provide 1.9 MW for 7.5 hrs (e.g., $$\frac{9.6 \text{ hrs} \times 1.5 \text{ MW}}{1.9 \text{ MW}}).$$

The data processing system may determine respective powers of 0.95 MW, 0.3167 MW, 1.00 MW, and 0.6333 MW, for a total of 2.9 MW and a time of 7.5 hrs.

In some cases, the discharge request may include a period of time (e.g., instead of a power requirement). For example, the period of time may be 5 hrs. The data processing system may calculate a power capacity of the ESS for the period of time. For example, the data processing system may calculate the power capacity to be 3.44 MW for 5 hrs. (e.g., 0.48 MW+0.96 MW+1 MW+1 MW). The data processing system may indicate to the controller of the energy grid that the ESS can satisfy the discharge request. The data processing system may determine a discharge control protocol including indications of the respective power levels (e.g., 0.48 MW, 0.96 MW, 1 MW, 1 MW).

In some embodiments, the data processing system may calculate multiple power capacities of the ESS prior to receiving a discharge request (e.g., without ever receiving the discharge request). For example, the data processing system may preemptively calculate potential lengths of time to provide power to the energy grid and calculate the multiple power capacities of the ESS based on the potential lengths of time and the current energy levels of the energy storage units of the ESS. The data processing system may transmit a message indicating the multiple power capacities and/or otherwise an amount of power that the ESS can discharge to the energy grid to the controller of the energy grid, in some cases over a time period (e.g., the data processing system can transmit data of determined discharged control protocols to the grid controller). The message may be a bid to provide energy to the energy grid and in some cases can include other data such as a price for the energy, a time period for the discharge, an amount of renewable energy that can directed to the energy grid, an amount of energy to purchase from the energy grid, etc. The controller of the energy grid may determine whether to accept the bid. In response to accepting the bid, the controller of the energy grid can transmit a message back to the data processing system indicating the bid is accepted. In response to receiving the message, the controller can discharge energy to the energy grid according to the accepted bid (e.g., the proposed lengths of time and amounts of power of the discharge control protocol). The controller can discharge the energy storage units according to the discharge control protocol.

In an aspect, the present disclosure describes a system. The system may comprise a renewable energy powerplant coupled to an energy grid, the renewable energy powerplant comprising an energy storage system (ESS), the ESS comprising a plurality of energy storage units each comprising an amount of stored energy; and one or more processors, the processors configured to: for each of the plurality of energy storage units, calculate a length of time to complete discharge for the energy storage unit according to a rated power capacity of the energy storage unit and an amount of stored energy in the energy storage unit; determine a discharge control protocol for the plurality of energy storage units based on the calculated lengths of time to complete discharge, the discharge control protocol indicating a period of time of at least two periods of time to discharge power to the energy grid and an amount of power of at least two amounts of power to discharge to the energy grid corresponding to the period of time; and discharge the plurality of energy storage units to the energy grid according to the discharge control protocol.

In some embodiments, the one or more processors are further configured to rank the plurality of energy storage units according to the calculated lengths of time to complete discharge of each energy storage unit; and determine a first length of time of the calculated lengths of time to complete discharge for all of the plurality of energy storage units based on the ranking, wherein the one or more processors are configured to determine the discharge control protocol based on the determination of the first length of time based on the ranking.

In some embodiments, the first length of time indicates a length of time to complete discharge at the rated power capacity of each of the plurality of energy storage units.

In some embodiments, the one or more processors are further configured to calculate, for each of the plurality of energy storage units, a power capacity of the energy storage unit according to the amount of stored energy in the energy storage unit and the first length of time, wherein the first length of time indicates a length of time to complete discharge at the rated power capacity of a first energy storage unit of the plurality of energy storage units; calculate, for each of the plurality of energy storage units, a minimum power capacity between the rated power capacity of the energy storage unit and the calculated power capacity of the energy storage unit; and combine the minimum power capacity for each of the plurality of energy storage units to calculate a power capacity of the ESS, wherein the discharge control protocol is further based on the combination.

In some embodiments, the power capacity of the ESS is less than a rated power capacity of the ESS. In some embodiments, the one or more processors are further configured to determine a power requirement to discharge energy from the plurality of energy storage units to the energy grid based on the combination, wherein the amount of power to discharge to the energy grid is based on the power requirement. In some embodiments, the one or more processors are further configured to receive a discharge request to discharge power to the energy grid, the discharge request indicating a second length of time to discharge energy from the plurality of energy storage units to the energy grid; and responsive to determining the second length of time is greater than a lowest length of time of the calculated lengths of time and less than a greatest length of time of the calculated lengths of time, determine the at least two amounts of power to discharge to the energy grid.

In some embodiments, a first energy storage capacity of a first energy storage unit of the plurality of energy storage units is different from a second energy storage capacity of a second energy storage unit of the plurality of energy storage units. In some embodiments, a first amount of stored energy in a first energy storage unit of the plurality of energy storage units is different from a second amount of stored energy in a second energy storage unit of the plurality of energy storage units. In some embodiments, the one or more processors are further configured to calculate a first length of time to complete discharge for the ESS according to a rated power capacity of the ESS and an amount of stored energy in the ESS; and compare the first length of time to the calculated lengths of time, wherein determining the discharge protocol is further based on the comparison.

In another aspect, the present disclosure describes a method. The method may include for each of a plurality of energy storage units, calculating, by one or more processors, a length of time to complete discharge for the energy storage unit according to a rated power capacity of the energy storage unit and an amount of stored energy in the energy storage unit, wherein a renewable energy powerplant coupled to an energy grid comprises an energy storage system (ESS) comprising the plurality of energy storage units, each of the plurality of energy storage units comprising an amount of stored energy; determining, by the one or more processors, a discharge control protocol for the plurality of energy storage units based on the calculated lengths of time to complete discharge, the discharge control protocol indicating a period of time of at least two periods of time to discharge power to the energy grid and an amount of power of at least two amounts of power to discharge to the energy grid corresponding to the period of time; and discharging, by the one or more processors, the plurality of energy storage units to the energy grid according to the discharge control protocol.

In some embodiments, the method may include ranking, by the one or more processors, the plurality of energy storage units according to the calculated lengths of time to complete discharge of each energy storage unit; and determining, by the one or more processors, a first length of time of the calculated lengths of time to complete discharge for all of the plurality of energy storage units based on the ranking, wherein the determination of the discharge control protocol is based on the determination of the first length of time based on the ranking. In some embodiments, the first length of time indicates a length of time to complete discharge at the rated power capacity of each of the plurality of energy storage units. In some embodiments, the method may include calculating, by the one or more processors for each of the plurality of energy storage units, a power capacity of the energy storage unit according to the amount of stored energy in the energy storage unit and the first length of time, wherein the first length of time is the first length of time to complete discharge at the rated power capacity of a first energy storage unit of the plurality of energy storage units; calculating, by the one or more processors for each of the plurality of energy storage units, a minimum power capacity between the rated power capacity of the energy storage unit and the calculated power capacity of the energy storage unit; and combining, by the one or more processors, the minimum power capacity for each of the plurality of energy storage units to calculate a power capacity of the ESS, wherein the discharge control protocol is further based on the combination.

In some embodiments, the power capacity of the ESS is less than a rated power capacity of the ESS. In some embodiments, the method may include determining, by the one or more processors, a power requirement to discharge energy from the plurality of energy storage units to the energy grid based on the combination, wherein the discharge control protocol comprises the power requirement. In some embodiments, the discharge control protocol comprises a second length of time to discharge energy from the plurality of energy storage units to the energy grid, the second length of time greater than a lowest length of time of the calculated lengths of time and less than a greatest length of time of the calculated lengths of time. In some embodiments, a first energy storage capacity of a first energy storage unit of the plurality of energy storage units is different from a second energy storage capacity of a second energy storage unit of the plurality of energy storage units.

In some embodiments, the method may include ranking, by the one or more processors, the plurality of energy storage units according to the calculated lengths of time to complete discharge of each energy storage unit; and determining, by the one or more processors, a second length of time of the calculated lengths of time to complete discharge for all of the plurality of energy storage units based on the ranking, wherein the determination of the discharge control protocol is based on the determination of the second length of time based on the ranking. In some embodiments, the second length of time is the second length of time to complete discharge at the rated power capacity of each of the plurality of energy storage units.

In some embodiments, the method may include calculating, by the one or more processors for each of the plurality of storage units, a power capacity of the storage unit according to the amount of energy stored in the energy storage unit and the second length of time, wherein the second length of time is the second length of time to complete discharge at the rated power capacity of a first energy storage unit of the plurality of energy storage units; calculating, by the one or more processors for each of the plurality of energy storage units, a minimum power capacity between the rated power capacity of the energy storage unit and the power capacity of the storage unit; and combining, by the one or more processors, the minimum for each of the plurality of energy storage units to calculate a power capacity of the ESS, wherein the discharge control protocol is further based on the combination. In some embodiments, the power capacity of the ESS is less than a rated power capacity of the ESS. In some embodiments, the method may include determining, by the one or more processors, a power requirement to discharge energy from the plurality of energy storage units to the energy grid based on the combination, wherein the discharge control protocol comprises the power requirement.

In some embodiments, the discharge control protocol comprises a second length of time to discharge energy from the plurality of energy storage units to the energy grid, the second length of time greater than a lowest length of time of the calculated lengths of time and less than a greatest length of time of the calculated lengths of time. In some embodiments, a first energy storage capacity of a first energy storage unit of the plurality of energy storage units is different from a second energy storage capacity of a second energy storage unit of the plurality of energy storage units.

In yet another aspect, the present disclosure describes a non-transitory computer readable storage medium. The non-transitory computer readable storage medium comprising instructions stored thereon that, when executed by a processor cause the processor to: for each of the plurality of energy storage units, calculate a length of time to complete discharge for the energy storage unit according to a rated power capacity of the energy storage unit and an amount of stored energy in the energy storage unit; determine a discharge control protocol for the plurality of energy storage units based on the calculated lengths of time to complete discharge, the discharge control protocol indicating a period of time of at least two periods of time to discharge power to the energy grid and an amount of power of at least two amounts of power to discharge to the energy grid corresponding to the period of time; and discharge the plurality of energy storage units to the energy grid according to the discharge control protocol.

In some embodiments, the instructions, when executed by the processor, cause the processor to rank the plurality of energy storage units according to the calculated lengths of time to complete discharge of each energy storage unit; and determine a first length of time of the calculated lengths of time to complete discharge for all of the plurality of energy storage units based on the ranking, wherein the one or more processors are configured to determine the discharge control protocol based on the determination of the first length of time based on the ranking.

Computing Environment

Having discussed specific embodiments of the present solution, it may be helpful to describe aspects of the operating environment as well as associated system components (e.g., hardware elements) in connection with the methods and systems described herein.

Figure 4A:
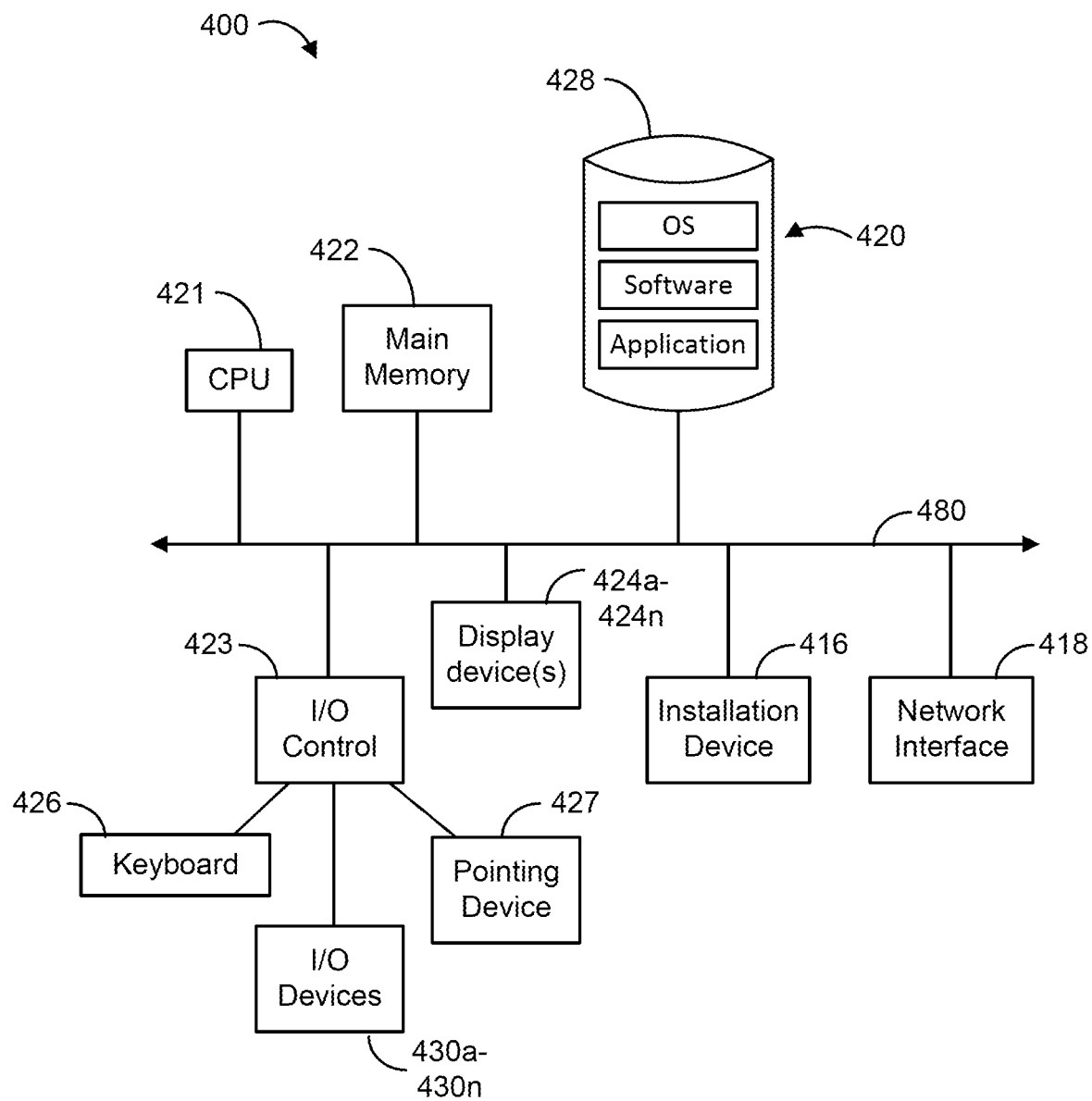
FIGS. 4A and 4B are block diagrams depicting embodiments of computing devices useful in connection with the methods and systems described herein.
Figure 4B:
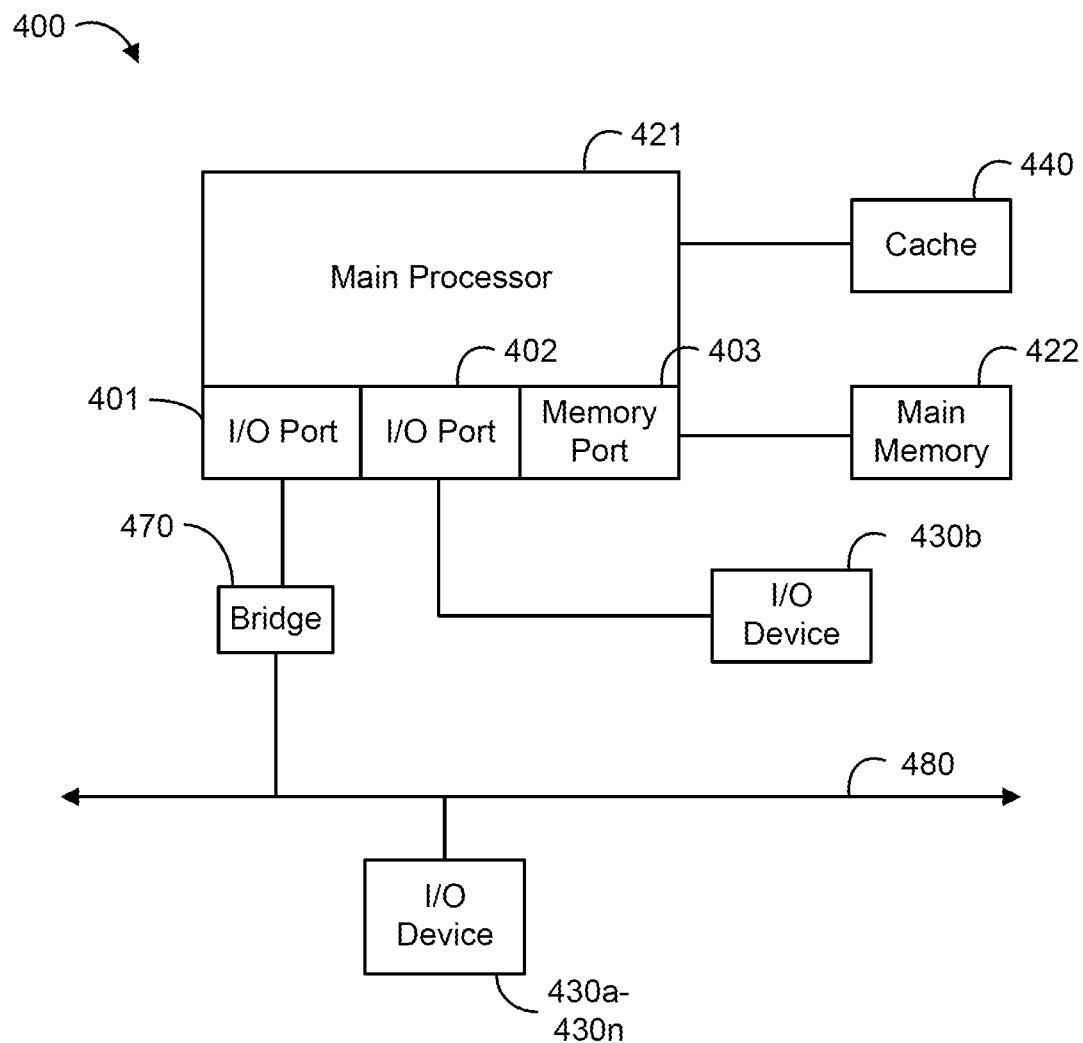

The systems discussed herein may be deployed as and/or executed on any type and form of computing device, such as a computer, network device or appliance capable of communicating on any type and form of network and performing the operations described herein. FIGS. 4A and 4B depict block diagrams of a computing device 400 useful for practicing an embodiment of the systems and methods described herein. As shown in FIGS. 4A and 4B, each computing device 400 includes a central processing unit 421, and a main memory unit 422. As shown in FIG. 4A, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4B, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 400 may be based on any of these processors, or any other processor capable of operating as described herein.

The main memory unit 422 may be one or more memory chips capable of storing data and allowing any storage location to be directly accessed by the central processing unit 421, such as any type or variant of Static random access memory (SRAM), Dynamic random access memory (DRAM), Ferroelectric RAM (FRAM), NAND Flash, NOR Flash and Solid State Drives (SSD). The main memory unit 422 may be based on any of the above described memory chips, or any other available memory chips capable of operating as described herein. In the embodiment shown in FIG. 4A, the central processing unit 421 communicates with main memory unit 422 via a system bus 480 (described in more detail below). FIG. 4B depicts an embodiment of a computing device 400 in which the processor communicates directly with the main memory unit 422 via a memory port 403. For example, in FIG. 4B the main memory unit 422 may be DRDRAM.

FIG. 4B depicts an embodiment in which the central processing unit 421 communicates directly with cache memory 440 via a secondary bus, sometimes referred to as a backside bus. In other embodiments, the central processing unit 421 communicates with cache memory 440 using the system bus 480. Cache memory 440 typically has a faster response time than main memory unit 422 and is provided by, for example, SRAM, BSRAM, or EDRAM. In the embodiment shown in FIG. 4B, the central processing unit 421 communicates with various I/O devices 430 via a local system bus 480. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the central processing unit 421 may use an Advanced Graphics Port (AGP) to communicate with the display 424. FIG. 4B depicts an embodiment of a computer 400 in which the central processing unit 421 may communicate directly with I/O device 430b, for example via HYPERTRANSPORT, RAPIDIO, or INFINIBAND communications technology. FIG. 4B also depicts an embodiment in which local busses and direct communication are mixed: the central processing unit 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screens, and drawing tablets. Output devices include video displays, speakers, inkjet printers, laser printers, projectors and dye-sublimation printers. The I/O devices may be controlled by an I/O controller 423 as shown in FIG. 4A. The I/O controller may control one or more I/O devices such as a keyboard 426 and a pointing device 427, e.g., a mouse or optical pen. Furthermore, an I/O device may also provide storage and/or an installation device 416 for the computing device 400. In still other embodiments, the computing device 400 may provide USB connections (not shown) to receive handheld USB storage devices such as the USB Flash Drive line of devices manufactured by Twintech Industry, Inc., of Los Alamitos, California.

Referring again to FIG. 4A, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 203 through a variety of connections including, but not limited to, standard telephone lines, LAN or WAN links (e.g., 802.4, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.4, IEEE 802.4a, IEEE 802.4b, IEEE 802.4g, IEEE 802.4n, IEEE 802.4ac, IEEE 802.4ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some implementations, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some implementations, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 480 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4A and 4B may operate under the control of an operating system, which control scheduling of tasks and access to system resources. The computing device 400 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some implementations, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Any references to ranges or values can be references to approximations of the same ranges or values. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system, comprising:
   a renewable energy powerplant coupled to an energy grid, the renewable energy powerplant comprising an energy storage system (ESS), the ESS comprising a plurality of energy storage units each comprising an amount of stored energy; and
   one or more processors configured to:
      for each of the plurality of energy storage units, calculate a length of time to complete discharge for the energy storage unit according to a rated power capacity of the energy storage unit and an amount of stored energy in the energy storage unit;
      determine a discharge control protocol for the plurality of energy storage units based on the calculated lengths of time to complete discharge, the discharge control protocol indicating a period of time of at least two periods of time to discharge power to the energy grid and an amount of power of at least two amounts of power to discharge to the energy grid corresponding to the period of time; and
      discharge the plurality of energy storage units to the energy grid according to the discharge control protocol.

2. The system of claim 1, wherein the one or more processors are further configured to:
   rank the plurality of energy storage units according to the calculated lengths of time to complete discharge of each energy storage unit; and
   determine a first length of time of the calculated lengths of time to complete discharge for all of the plurality of energy storage units based on the ranking,
      wherein the one or more processors are configured to determine the discharge control protocol based on the determination of the first length of time based on the ranking.

3. The system of claim 2, wherein the first length of time indicates a length of time to complete discharge at the rated power capacity of each of the plurality of energy storage units.

4. The system of claim 2, wherein the one or more processors are further configured to:
   calculate, for each of the plurality of energy storage units, a power capacity of the energy storage unit according to the amount of stored energy in the energy storage unit and the first length of time, wherein the first length of time indicates a length of time to complete discharge at the rated power capacity of a first energy storage unit of the plurality of energy storage units;
   calculate, for each of the plurality of energy storage units, a minimum power capacity between the rated power capacity of the energy storage unit and the calculated power capacity of the energy storage unit; and
   combine the minimum power capacity for each of the plurality of energy storage units to calculate a power capacity of the ESS, wherein the discharge control protocol is further based on the combination.

5. The system of claim 4, wherein the power capacity of the ESS is less than a rated power capacity of the ESS.

6. The system of claim 4, wherein the one or more processors are further configured to:
   determine a power requirement to discharge energy from the plurality of energy storage units to the energy grid based on the combination, wherein the amount of power to discharge to the energy grid is based on the power requirement.

7. The system of claim 1, wherein the one or more processors are further configured to:
receive a discharge request to discharge power to the energy grid, the discharge request indicating a second length of time to discharge energy from the plurality of energy storage units to the energy grid; and
responsive to determining the second length of time is greater than a lowest length of time of the calculated lengths of time and less than a greatest length of time of the calculated lengths of time, determine the amount of power to discharge to the energy grid.

8. The system of claim 1, wherein a first energy storage capacity of a first energy storage unit of the plurality of energy storage units is different from a second energy storage capacity of a second energy storage unit of the plurality of energy storage units.

9. The system of claim 1, wherein a first amount of stored energy in a first energy storage unit of the plurality of energy storage units is different from a second amount of stored energy in a second energy storage unit of the plurality of energy storage units.

10. The system of claim 1, wherein the one or more processors are further configured to:
calculate a first length of time to complete discharge for the ESS according to a rated power capacity of the ESS and an amount of stored energy in the ESS; and
compare the first length of time to the calculated lengths of time, wherein determining the discharge protocol is further based on the comparison.

11. A method comprising:
for each of a plurality of energy storage units, calculating, by one or more processors, a length of time to complete discharge for the energy storage unit according to a rated power capacity of the energy storage unit and an amount of stored energy in the energy storage unit, wherein a renewable energy powerplant coupled to an energy grid comprises an energy storage system (ESS) comprising the plurality of energy storage units, each of the plurality of energy storage units comprising an amount of stored energy;
determining, by the one or more processors, a discharge control protocol for the plurality of energy storage units based on the calculated lengths of time to complete discharge, the discharge control protocol indicating a period of time of at least two periods of time to discharge power to the energy grid and an amount of power of at least two amounts of power to discharge to the energy grid corresponding to the period of time; and
discharging, by the one or more processors, the plurality of energy storage units to the energy grid according to the discharge control protocol.

12. The method of claim 11, further comprising:
ranking, by the one or more processors, the plurality of energy storage units according to the calculated lengths of time to complete discharge of each energy storage unit; and
determining, by the one or more processors, a first length of time of the calculated lengths of time to complete discharge for all of the plurality of energy storage units based on the ranking,
wherein the determination of the discharge control protocol is based on the determination of the first length of time based on the ranking.

13. The method of claim 12, wherein the first length of time indicates a length of time to complete discharge at the rated power capacity of each of the plurality of energy storage units.

14. The method of claim 12, further comprising:
calculating, by the one or more processors for each of the plurality of energy storage units, a power capacity of the energy storage unit according to the amount of stored energy in the energy storage unit and the first length of time, wherein the first length of time is the first length of time to complete discharge at the rated power capacity of a first energy storage unit of the plurality of energy storage units;
calculating, by the one or more processors for each of the plurality of energy storage units, a minimum power capacity between the rated power capacity of the energy storage unit and the calculated power capacity of the energy storage unit; and
combining, by the one or more processors, the minimum power capacity for each of the plurality of energy storage units to calculate a power capacity of the ESS, wherein the discharge control protocol is further based on the combination.

15. The method of claim 14, wherein the power capacity of the ESS is less than a rated power capacity of the ESS.

16. The method of claim 14, further comprising:
determining, by the one or more processors, a power requirement to discharge energy from the plurality of energy storage units to the energy grid based on the combination, wherein the discharge control protocol comprises the power requirement.

17. The method of claim 11, wherein the discharge control protocol comprises a second length of time to discharge energy from the plurality of energy storage units to the energy grid, the second length of time greater than a lowest length of time of the calculated lengths of time and less than a greatest length of time of the calculated lengths of time.

18. The method of claim 11, wherein a first energy storage capacity of a first energy storage unit of the plurality of energy storage units is different from a second energy storage capacity of a second energy storage unit of the plurality of energy storage units.

19. A non-transitory computer readable storage medium comprising instructions stored thereon that, when executed by a processor, cause the processor to:
for each of the plurality of energy storage units, calculate a length of time to complete discharge for the energy storage unit according to a rated power capacity of the energy storage unit and an amount of stored energy in the energy storage unit;
determine a discharge control protocol for the plurality of energy storage units based on the calculated lengths of time to complete discharge, the discharge control protocol indicating a period of time of at least two periods of time to discharge power to an energy grid and an amount of power of at least two amounts of power to discharge to the energy grid corresponding to the period of time; and
discharge the plurality of energy storage units to the energy grid according to the discharge control protocol.

20. The non-transitory computer readable storage medium of claim 19, wherein the instructions, when executed by the processor, cause the processor to:
rank the plurality of energy storage units according to the calculated lengths of time to complete discharge of each energy storage unit; and determine a first length of time of the calculated lengths of time to complete discharge for all of the plurality of energy storage units based on the ranking,
wherein the one or more processors are configured to determine the discharge control protocol based on the determination of the first length of time based on the ranking.

\* \* \* \* \*